United States Patent [19]
Neuhold

[11] Patent Number: 6,065,235
[45] Date of Patent: May 23, 2000

[54] SLIDE MOUNT

[75] Inventor: Arnold Neuhold, Farchant, Germany

[73] Assignee: L+N Plast-Vertriebs GmbH, Untereglfing, Germany

[21] Appl. No.: 09/114,674

[22] Filed: Jul. 13, 1998

[30] Foreign Application Priority Data

Jul. 14, 1997 [DE] Germany ............................ 297 12 435

[51] Int. Cl.$^7$ .................................................. A47G 1/06
[52] U.S. Cl. ................................ 40/709; 40/705; 40/709; 40/707; 40/710
[58] Field of Search ............................. 40/705, 709, 707, 40/710, 701

[56] References Cited

U.S. PATENT DOCUMENTS

| | | | |
|---|---|---|---|
| 3,341,960 | 9/1967 | Florjancic et al. | 40/709 |
| 4,250,641 | 2/1981 | Thompson | 40/709 |
| 4,607,442 | 8/1986 | Desmarais et al. | 40/709 |
| 5,392,548 | 2/1995 | Truc et al. | 40/709 |

Primary Examiner—Cassandra H. Davis
Attorney, Agent, or Firm—Dilworth & Barrese

[57] ABSTRACT

A one-piece or two-piece slide mount, having a window and an inner receiving chamber for the slide film which can be introduced into the mount from a narrow side thereof, and at least two guide ribs running in the direction of insertion, located outside the window on two sides in the transverse direction to the direction of insertion and non-slidably fixing this film transverse to the direction of insertion and on the plane of the inserted slide film. These guide ribs form an insertion aid. Over a longer initial guide portion (7) starting from the insertion entrance in the transverse direction to the direction of insertion (E), the two guide ribs (5, 6) as an insertion aid have a much greater distance between them than the width of the slide film and with an inclined transition portion (8) in the direction of insertion (E) merge into a fixing portion (9). Such fixing portions (9) are spaced apart in the same transverse direction corresponding to the width of the slide film.

15 Claims, 1 Drawing Sheet

SLIDE MOUNT

BACKGROUND OF THE INVENTION

The invention relates to a slide mount, whether as a one-piece or two-piece mount, comprising a window and an inner receiving chamber for the slide film which can be introduced into the mount from a narrow side thereof, and at least two guide ribs running in the direction of insertion, located outside the window on two sides in the transverse direction to the direction of insertion and non-slidably fixing this mount transverse to the direction of insertion and on the plane of the inserted slide film, whereby these guide ribs form an insertion aid.

Such a slide mount is already known and comprises as an insertion aid an inclined outwards extension over a short distance of 1 to 2 mm maximum at the insertion entrance of the guide ribs such that together the guide ribs slightly diverge toward the insertion entrance. This insertion entrance has nevertheless proved to be inadequate.

In a mounting machine, the mounts from a magazine on a mounting plane are placed into the mounting position at such speed and without any possibility of stopping them that while avoiding complicated control mechanisms, it is difficult to bring about a very precise adjustment of the mount's mounting position, unless there is considerable outlay in terms of structural design and cost.

SUMMARY OF THE INVENTION

The invention's object is therefore to design a slide mount in which it is possible to insert the slide film into the mount reliably and without interference, even if there is inaccurate adjustment of the slide mount's mounting position when non-slidably positioning the slide film within the mount and at a high mounting speed.

In accordance with the invention, this object is solved in that over a longer initial guide portion starting from the insertion entrance in the transverse direction to the direction of insertion, the two guide ribs as an insertion aid have a greater distance between them than the width of the slide film, and in that with an inclined transition in the direction of insertion they merge into a fixing portion; such fixing portions are spaced apart in the same transverse direction corresponding to the width of the slide film.

In conventional mounting machines, the start of the slide film in the region of the guide ribs is inserted into the mount whenever the slide film is not yet separated from the film strip. In this position, the slide film is non-slidably held essentially at the sides and therefore reacts to obstructions caused by the mount, such obstructions acting as an insertion barrier. The greater distance between the initial guide portions of the guide ribs therefore has an effect with regard to trouble-free insertion of the slide film into the mount even when the slide mount is not accurately adjusted in the mounting position. The contraction in the area of the fixing portions on the width of the slide film lies so far in the guiding insertion direction within the slide mount that if the slide film's leading end is located in this region, the slide film is no longer held at the trailing end and is therefore non-slidable at the sides where the slide film can therefore be adapted to the distance of the fixing portions set to the width of the slide film, allowing the slide film not only to be reliably and easily inserted into the mount even when the mounting position is badly set up, but also enabling it to be nicely fixed laterally within the mount.

The initial guide portions of the two guide ribs and the fixing portions can preferably be of approximately equal length.

The distance between the initial guide portions in the transverse direction to the direction of insertion may be about 2 mm larger than the distance between the fixing portions in the same transverse direction.

When guide ribs are mentioned here, they do not absolutely have to be continuous guide ribs. The ribs can also comprise an arrangement of short rib portions side by side. If the length of the ribs is then mentioned, the gaps between the rib portions are included.

DESCRIPTION OF THE PREFERRED EMBODIMENTS

Figure 1:
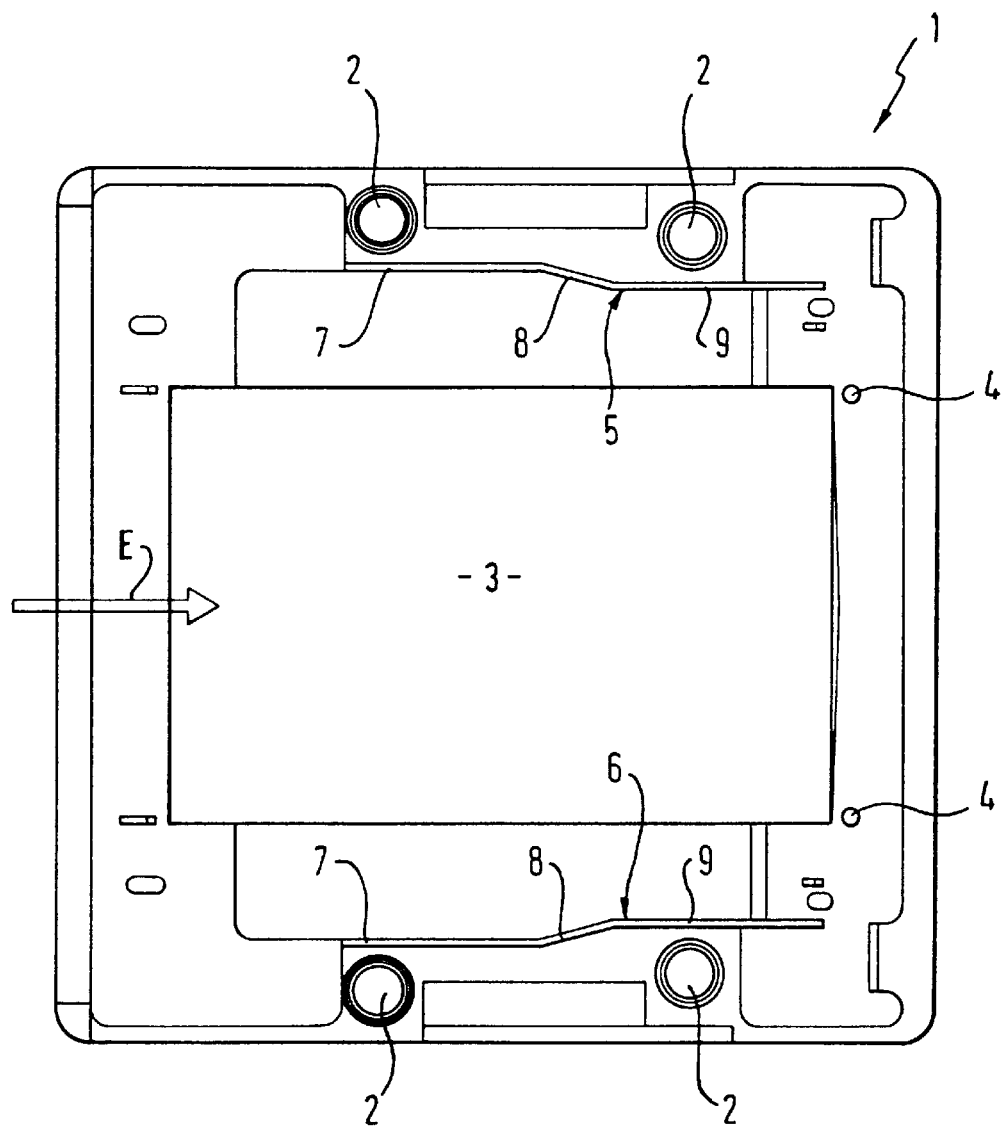

The invention will now be explained in further detail by means of an exemplary embodiment depicted in the drawing. The sole FIGURE shows a horizontal projection over the inside of the mount. Only the essential components are described here.

FIG. 1 shows the inside of a mount half 1, whereby the mount halves are joined together via the connecting points 2. A window 3 is located in the middle of the mount half. The slide film's direction of insertion is marked by the arrow E. The projections 4 identify limit stops. Guide ribs 5, 6 which are essentially parallel to one another are located in the transverse direction to the direction of insertion E at the sides of the window delimitations. These guide ribs 5, 6, which are continuous in this example, comprise an initial guide portion 7, a transition portion 8 that adjoins at an angle of preferably 15° to the direction of insertion and a fixing portion 9 that adjoins in the direction of insertion. These fixing portions 9 are thus called because their transverse distance is essentially adapted to the width of the slide film and non-slidably fixes this film in the transverse direction. In this example, the initial guide portions 7 have a distance between them which is greater by at least 2 mm in the transverse direction to the direction of insertion than the fixing portions 9. If for the above reasons, the slide mount cannot in fact be accurately aligned in the transverse direction to the direction of insertion, enough space remains between the initial guide portions 7 in the transverse direction for the slide film which is still secured at the trailing end, with the result that the guide ribs do not form an obstruction for the inserted slide film. It can be gathered from the drawing that the initial guide portions project relatively far into the slide mount, so that when the leading end of the slide film reaches the region of the inclined transition portions 8, the slide film's trailing end is free after the slide film has been cut, and lateral alignment along the transition portions is therefore possible such that the width of the slide film can—by lateral displacement—be accurately adapted to the distance of the fixing portions 9.

I claim:

1. A slide mount comprising a window and an inner receiving chamber for slide film which is insertable into a frame from a narrow side thereof, and at least two guide ribs running in a direction of insertion, located outside the window onto two sides in a transverse direction to the direction of insertion and structured and arranged for non-slidably fixing this film transverse to the direction of insertion an on a plane of the inserted slide film, wherein the guide ribs form an insertion aid and over a longer initial guide portion starting from an insertion entrance in the transverse direction to the direction of insertion, said two guide ribs are structured and arranged as an insertion aid to have a much greater distance between them than a width of slide film being inserted therebetween and with an inclined transition portion in the direction of insertion merging into a fixing portion, said fixing portions spaced apart in the same transverse direction corresponding to the width of slide film being inserted, and said guide ribs are positioned such that said inclined transition portions are positioned between connecting points of halves of the slide mount in the direction of insertion of the film.

2. A slide mount according to claim 1, wherein said initial guide portions of said two guide ribs and said fixing portions are of essentially equal length.

3. A slide mount according to claim 2, wherein the distance between said initial guide portions in the transverse direction to the direction of insertion is approximately 2 mm greater than the distance between said fixing portions in the same transverse direction.

4. A slide mount according to claim 2, wherein said transition portions are each inclined at an angle of about 15° to the direction of insertion of the film.

5. A slide mount according to claim 1, wherein the distance between said initial guide portions in the transverse direction to the direction of insertion is approximately 2 mm greater than the distance between said fixing portions in the same transverse direction.

6. A slide mount according to claim 3, wherein said transition portions are each inclined at an angle of about 15° to the direction of insertion of the film.

7. A slide mount according to claim 1, wherein said guide ribs are structured and arranged to protrude above and outside said window.

8. A slide mount according to claim 7, wherein said transition portions are each inclined at an angle of about 15° to the direction of insertion of the film.

9. A slide mount according to claim 1, wherein said initial guide portions of said guide ribs are structured and arranged to project relatively far into the slide mount such that when a leading end of a slide film being inserted reaches an area of said inclined transition portions, a trailing end of the slide film being inserted is free after the slide film has been cut, and lateral alignment along said inclined transition portions is therefore possible, so that a width of the slide film being inserted can, by lateral displacement, be accurately adapted to distance between said fixing portions.

10. A slide mount according to claim 9, wherein said transition portions are each inclined at an angle of about 15° to the direction of insertion of the film.

11. A slide mount according to claim 1, wherein said guide ribs are each formed to be continuous guide ribs.

12. A slide according to claim 1, wherein said guide ribs are each formed to be constituted by an arrangement of short rib portions, side by side.

13. A slide mount according to claim 1 formed as a one-piece mount.

14. A slide mount according to claim 1, formed as a two-piece mount.

15. A slide mount according to claim 1, wherein said transition portions are each inclined at an angle of about 15° to the direction of insertion of the film.

* * * * *